Patented Dec. 5, 1933

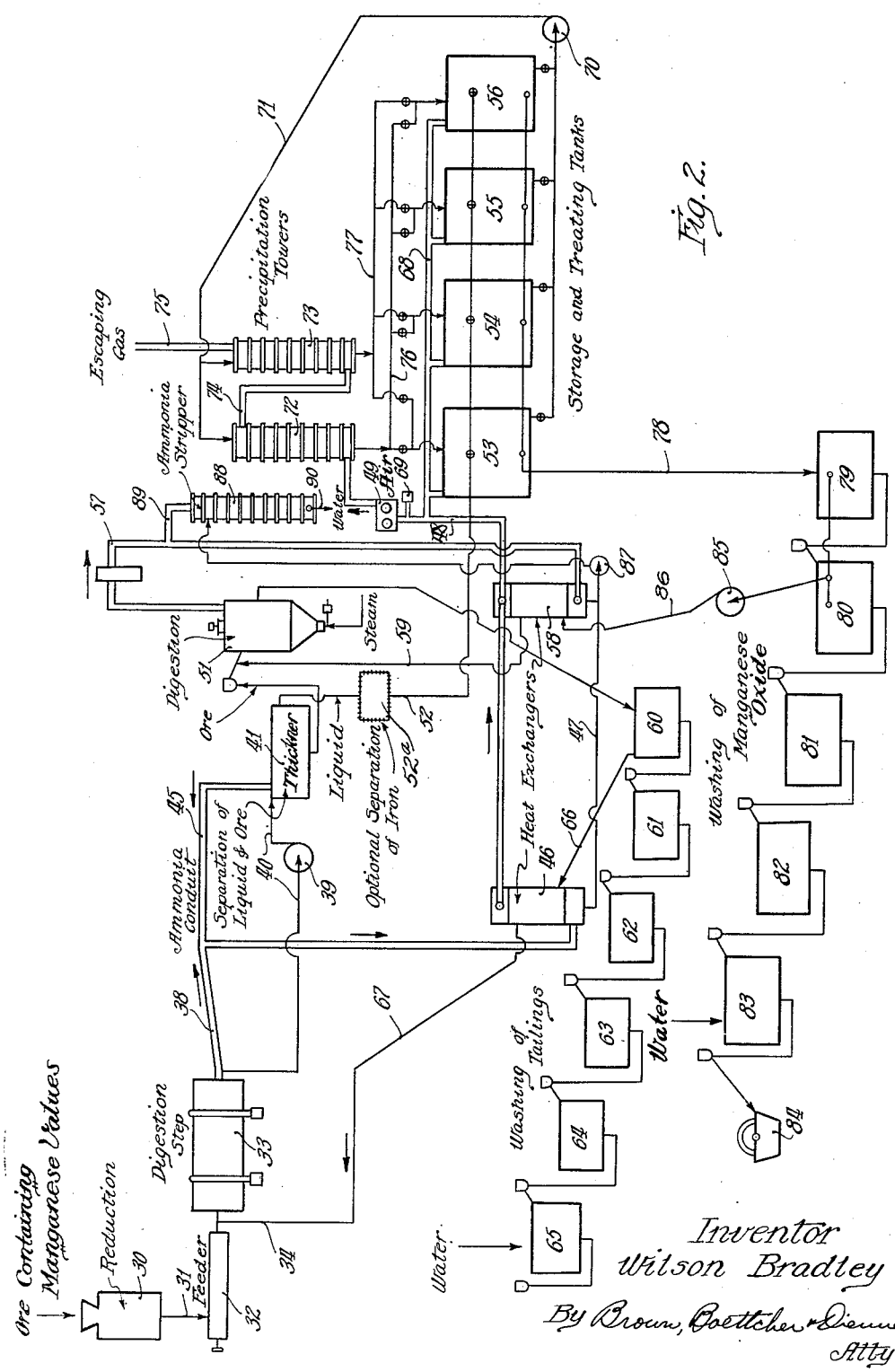

1,937,508

UNITED STATES PATENT OFFICE 1,937,508

PROCESS FOR RECOVERING MANGANESE VALUES

Wilson Bradley, Deerwood, Minn., assignor to Bradley-Fitch Company, Minneapolis, Minn., a corporation of Minnesota Application September 14, 1927
Serial No. 219,545

5 Claims. (Cl. 23—145)

This invention relates generally to the recovery of manganese values from ore and like material and in particular to a commercially practicable process and apparatus employing the principle of leaching manganous oxide from reduced ore by a salt solution such, for example, as disclosed in the co-pending application of N. Arthur Laury, Serial No. 46,739, filed July 29, 1925, corresponding to British Patent No. 284,098 of March 1, 1927.

The process of said application consists of roasting and reducing the ore to form manganous oxide, extracting the manganous oxide by a solution, preferably ammonium sulphate, under conditions which release the ammonia and form manganous sulphate, from which manganese is recovered preferably by precipitating with ammonia in order to regenerate the ammonium sulphate solution.

The Laury application states that it is desirable to convert all the ammonium sulphate into manganous sulphate so that there is no excess leaching salt in the resulting leach liquor. Under such conditions there is danger of precipitating some of the manganese which has already gone into solution and, furthermore, it is difficult using such small concentration of ammonium sulphate to extract all the manganous oxide from the ore.

The above named application also describes the precipitation of the manganese as manganous hydroxide. This substance is soluble in an excess of ammonium sulphate. Such solubility is advantageous in the extraction step of the process and disadvantageous in the precipitating step. As the precipitation by ammonia proceeds there is an increase in the concentration of ammonium sulphate, which increase operates against complete precipitation. The present invention overcomes this difficulty and insures complete precipitation when desired.

It is one object of the present invention to provide an excess of leaching agent during the extraction in order to increase the extracting power of the leach liquor and to remove substantially all the manganous oxide from the reduced ore.

Still another object of the invention is to carry out the digestion under conditions favoring the elimination of the ammonia produced when leaching with ammonium salts such as ammonium sulphate.

Another object is to provide a process and apparatus for leaching, precipitating and washing the insolubles of the process, so that a maximum yield of manganese can be obtained with a minimum amount of lost liquor and with the employment of a minimum amount of wash water.

Still another object of the invention is to provide a method for the complete precipitation of the manganese from the solution in spite of the fact that the excess leaching salt tends to hold the manganous material in solution.

A particular object of the invention is to oxidize the manganous compounds to form a product which is more readily precipitated, which is less soluble in the leaching salt and which can be more readily washed free from impurities.

In the drawings

Fig. 2 is a diagrammatic illustration of the apparatus employed including the countercurrent systems for washing the insolubles.

Figure 1:
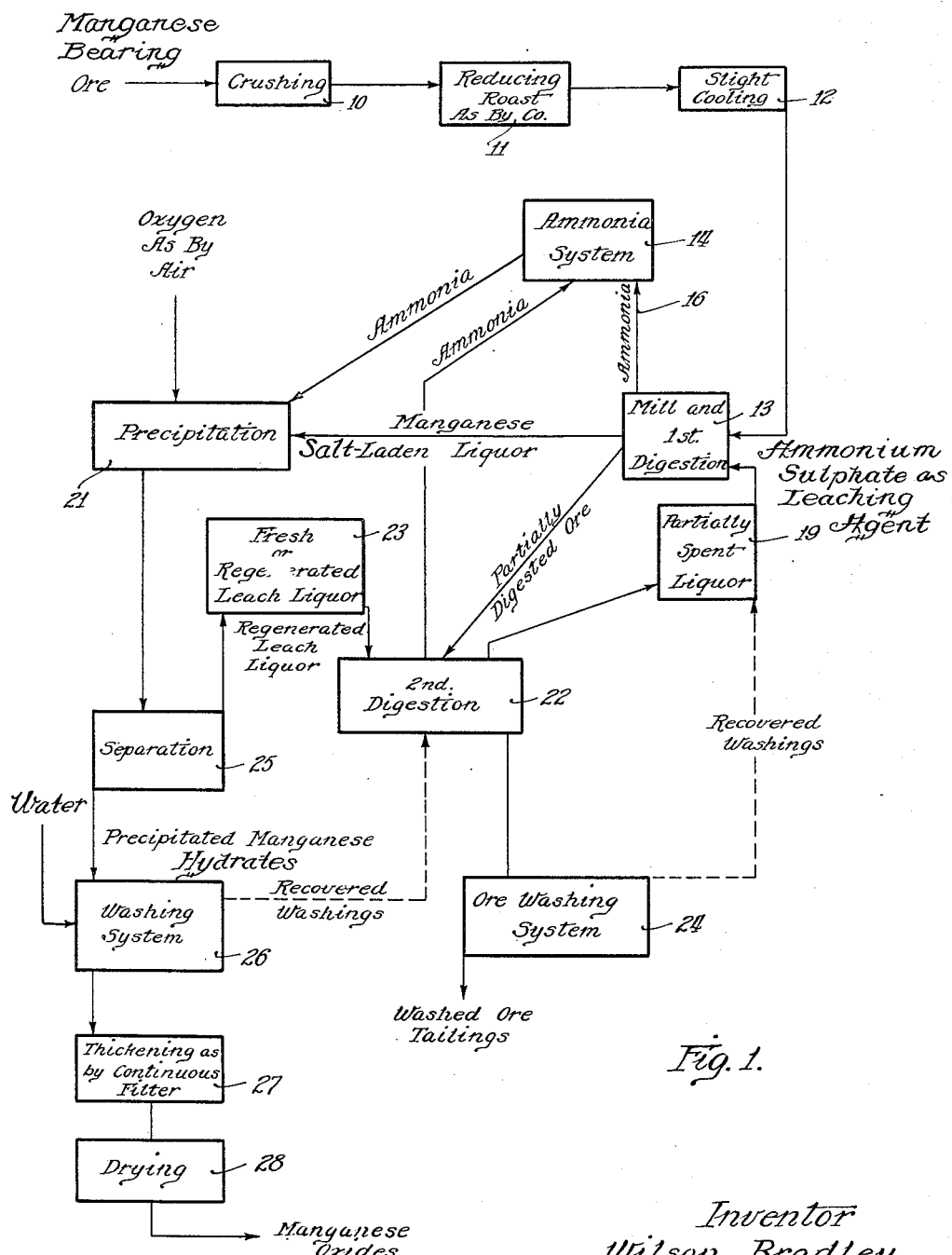
Fig. 1 is a diagrammatic representation of the steps of the process.

The following description and explanation of the process is based upon the use of ammonium sulphate as the leaching liquor, but it is to be understood that the process is not necessarily limited to such salt, nor are the steps of the process necessarily limited to the disclosure in the drawings. It is also to be understood that the carrier solution may contain any salt or other solvent characterized by an ability to convert manganous oxide into a soluble manganous salt simultaneously forming an alkaline or other product which normally precipitates manganese from said manganous salt solution, except in the presence of an excess of the carrier solution, or which precipitates manganese compounds after oxidation of its manganous form.

The ore for which the following process is specially adapted is one containing silica, hematite, limonite, magnetite, psilomelane and pyrolusite, analyzing in part:

| | |
|---|---|
| Manganese | 19.32% |
| Iron | 24.34% |
| Silica | 25.07% |
| Calcium | Trace |

With manganic ores the first step is the reduction to manganous oxide. This is carried out under conditions which tend to minimize the amount of iron impurity that may be taken up in the digestion step. I have found that when reduction takes place above 650° centigrade, the iron impurity is rendered more soluble, and that lower temperatures decrease the iron content of the digestion liquors. I have also observed that lower digestion temperatures favor a reduction in the iron content.

The ore is first crushed to a coarse grade of about 8 to 10 mesh (a 4 mesh is also satisfactory) as indicated at 10, and it is then roasted in a reducing furnace as at 11, whereby all the manganic content is reduced at 450° to 500° centigrade to manganous oxide in from half an hour to an hour. With lower temperatures a longer time may be required. Any suitable reducing agent or combination of reducing agents may be employed, such for example as carbon monoxide, produced by the incomplete combustion of illuminating gas in the reducing furnace. By this method it will be observed that a quantity of water vapor is present during the reduction which may have some marked effect upon the physical form, stability and solubility of the constituents of the roasted and reduced ore. The time, temperature and reduction material may all affect the iron content to render it more or less soluble in the extraction process.

The reduced ore after leaving the furnace may, if desired, be cooled somewhat, as indicated at 12, being retained in a non-oxidizing or a reducing atmosphere. The cooled ore is next digested and this may be accomplished in a mill for wet grinding the ore to a finer mesh, or pulp. I have found that when the ore meets an ammonium salt solution there is an almost instant reaction indicated by the strong ammonia odor immediately acquired by the solution. This ammonia content and the rapid character of the digestion reaction are very important considerations in practical processes. Ammonia is a poison to the digestion, since it may react with the manganous salt formed to precipitate it with the danger that it may not be redissolved. The wet grinding and digestion are carried out in a mill indicated at 13 in communication with an ammonia system 14. The mill contains a shallow depth of liquor and is run at a temperature of 160° Fahrenheit (71° centigrade), which causes a partial expulsion of ammonia.

The mill may reduce the ore to a size which will pass a 385 mesh screen. The actual size is not so important in the chemistry of the process, but it is of course a feature of importance in handling the material by the equipment employed.

The mill 13 is operated upon the continuous feed basis, introducing at one end the ore and a supply of partially spent liquor, and withdrawing at the other end both the pulp and the ammonia, the latter at 16 to enter the ammonia system 14. The grinding operation in the ammonium sulphate liquor is one of the digestive stages of the process. The main process of digestion is desirably carried out in a countercurrent system, preferably of two stages. It is necessary to state that this part of the process is not a "batch" process, because there is an overlapping or crossing of products from these two stages of digestion. The general purpose is to treat partially digested ore with fresh ammonium sulphate as one step, and to treat the fresh ore with partially spent ammonium sulphate liquor as the other step. The first digestion step completes the action of the liquor, and the second digestion step exhausts the ore.

Accordingly, partially spent ammonium sulphate from a suitable supply 19 is run into the mill 13 in proper proportion to the entering ore. About a 5% solution is used containing approximately 3.9 parts of ammonium sulphate to 1.15 parts of manganous sulphate. The ratio of course may vary and the quantity of such solution is adjusted to provide in the mill about 16 parts of ammonium sulphate to 1 part of manganese (Mn) in the ore.

In connection with digestion of ore by ammonium sulphate solution, I have observed that the atmospheric pressure and the depth of liquid each have a significant influence. I am able to make a very good laboratory extraction in vacuo with solutions at room temperature. I have also ascertained that in large scale work, employing deeply filled digesters, the results are not as good as when shallow depths are used at the same pressures. It is my belief that in deep charges the increased hydrostatic pressure operates in the same direction as increased atmospheric pressure, each tending to increase the ammonia holding capacity of the solution. Under vacuum the dissolved ammonia is drawn out of solution. In a deep vessel escaping bubbles of ammonia at the bottom of the vessel are under greater pressure than bubbles at the top. Accordingly the ammonia capacity of the liquid at the bottom of any depth is greater than its capacity at the top layers. In digestions of the character here used, digestion may take place at the top forming manganous sulphate which, upon agitation, may be precipitated by increased ammonia content at the bottom. Depending therefore upon the pressure exerted upon the liquor, the temperature, the concentrations, etc., of particular installations, an adjustment of these factors must be made to prevent such a condition as reversal of the reaction at the bottom. I have also observed, in the laboratory experiments that under conditions, including shallow depth, air may be introduced to sweep out the ammonia without effecting oxidation of the manganese. The following reaction represents the changes that are expected to occur during digestion:—

$$MnO + (NH_4)_2SO_4 = MnSO_4 + 2NH_3 + H_2O$$

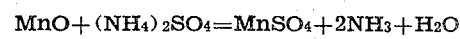

As the above reaction takes place the ammonium sulphate concentration decreases and the manganous sulphate increases. When the solution contains substantially equal molecular amounts of both salts, it is removed from the ore and reserved for the precipitation step indicated at 21. Although it is not necessary that the excess ammonium sulphate correspond to this ratio, it has been found that a heavier precipitate results with these proportions for the amount of ammonia used.

Although the digestion mass may be boiled to advantage for the elimination of ammonia, it has been found that the high temperature caused by steam injection tends to precipitate within the digester, a double salt of manganous and ammonium sulphates, the solubility of which appears to be less with increasing temperature. This is particularly characteristic of the first stage of digestion, wherever the final product has the equal molecular ratio of these salts.

The ore, now partially digested, is treated at 22 with fresh ammonium sulphate from a supply 23. This may be a new solution or a regenerated solution, as will appear hereinafter. This stage of the digestion may be carried out under the same conditions as described above for the first stage 13, and continues until substantially all the manganous oxide is extracted. The partially spent liquor resulting from this final digestion of the ore is then removed and forms the supply 19 to be used for the next leaching operation on fresh ore.

In the second stage of the digestion it is not so important that the liquid have a shallow depth, although the same advantages will result. The reason for this is believed to be that the second digestion contains a higher percentage of ammonium sulphate and a lower percentage of manganese in solution, both of which factors tend to lessen the precipitating power of the ammonia which may be dissolved. Another reason also is that the digestive reaction takes place more slowly, giving time for the escape of ammonia. This condition does not obtain in the first stage where the rich manganese ore reacts so rapidly with the digestant that the released ammonia cannot so readily escape in time to assure an ammonia content below the danger point.

The undissolved portion of the ore is transferred to a washing system indicated at 24 in order to remove therefrom the adhering liquor containing both manganous sulphate and ammonium sulphate. The washings containing both manganese sulphate and ammonium sulphate may be used at several places in the process.

When the spent leach liquor containing the manganese values is allowed to stand with consequent cooling, after its separation from the gangue, there is produced a settling precipitate of an insoluble iron product and a substantially iron free liquor. Therefore, when a very pure manganese product is desired, as for instance battery material, such a settling process is carried out. The sediment contains some manganese and is withdrawn as a low grade iron-manganese product. The iron free solution is used in the regular manner for the recovery of manganese.

It has not been ascertained whether the subsequent settling of the iron on quiescent standing results from coagulation of smaller particles already present insoluble, or from a delayed precipitation, or from a slow oxidation of ferrous iron to ferric iron. Whatever the mechanism of the separation may be it is not to be construed as limiting the process to the particular practice described. It is given as an example of one way which can be employed to free the product from attendant iron.

The spent leaching liquid which has been mentioned as reserved for the precipitating step 21 may be taken direct from digestion step 13 and cooled to about 50 degrees centigrade, which temperature has been found preferable for securing a rapidly settling form of manganese precipitate upon treatment with ammonia and air. However, it may be precipitated even at 80 degrees centigrade. The ammonia may be added either in aqueous solution or as a gas, or both, it being obtained from the ammonia system 14. It has been found that a slight excess of ammonia is desirable in order to reduce undesirable substances in the precipitate. The precipitation is represented by the following reactions:—

$$MnSO_4 + 2NH_4OH = Mn(OH)_2 + (NH_4)_2SO_4$$
$$2Mn(OH)_2 + O = 2MnO\cdot OH + H_2O$$

The $Mn(OH)_2$ is somewhat soluble in the $(NH_4)_2SO_4$, but when oxidized the resulting $MnO\cdot OH$ is insoluble.

Since there is ammonium sulphate present in excess prior to precipitation by ammonia, and since more ammonium sulphate is formed during the precipitation, the manganese cannot be completely precipitated by ammonia alone. This is because it is a characteristic of ammonium sulphate that it holds the manganous compound in solution against complete precipitation by ammonia. Upon separation of the manganese precipitated by ammonia in the absence of oxygen and the supernatent liquor, it will be found that a considerable portion of manganese remains dissolved in the liquor. This manganese contaminates the regenerated ammonium sulphate and lowers the efficiency of recovery. It is well known that an ammonical solution of a manganous salt is readily oxidized by air, effecting precipitation of the manganese in a more highly oxidized form than corresponds to the manganous hydroxide first precipitated by the ammonia. It has been found that if air is introduced into the leach liquor during or after the precipitation with ammonia, the precipitation is complete and the precipitate contains less impurities than when no air is used. For example, I have found that the use of an excess of ammonia and of air in the precipitation gives a product which can be easily washed to have a sulphur content as low as 0.5%. If an excess of ammonia is not employed, the precipitate is difficult to wash and the sulphur content may be as high as 5%. The oxygen of the air destroys all the manganous hydroxide by converting it to a manganic hydrate which is insoluble in ammonium sulphate. Thus a complete precipitation of manganese results. A simultaneous introduction of ammonia and of air is preferred in order to simplify the process and to impart to the precipitate a physical form which permits it readily to be washed free of impurities. However, it is to be understood that the process is not limited to this method. The ultimate aim is to subject the ammonical liquor containing the regenerated leaching salt to oxidation prior to using it for leaching purposes, thus to insure complete removal of manganese. In other words, the impregnated liquor from the digestion may be treated with ammonia in the absence of oxygen to precipitate a portion of the manganese as manganous hydroxide, and the filtrate from this step may be then oxidized to effect precipitation of a whole or a part of the remainder as manganic hydroxide.

From the foregoing it will be seen that upon precipitation of manganese with oxidation as above described, the ammonium sulphate originally employed is regenerated for further use, free from manganese. Without the oxidation, precipitation can be effected, but not completely, so that the regenerated ammonium sulphate will carry a quantity of manganous salt back to the digestion apparatus. Obviously, this is an inefficient procedure which is entirely remedied by the simple use of oxygen in the precipitation.

The regenerated leaching salt is separated from the precipitated manganese by a suitable separation process indicated at 25. The liquor is preferably used to replenish the supply 23 and the precipitate is treated in a washing system indicated at 26. The washings may be concentrated for addition to the ammonium sulphate supply at 23. The manganese precipitate after washing is preferably thickened, as by the use of a continuous filtration indicated at 27, and then subsequently dried as at 28.

The chemistry of the process is dependent in part upon the fact that manganous sulphate in the presence of a sufficient excess of ammonium sulphate is not precipitated by ammonia. The removal of ammonia during the digestion process readily eliminates danger of precipitating the manganese already dissolved. In order, however, to produce the interaction of ammonium sulphate with the manganous oxide at a commercial efficiency and to insure a practically complete digestion of the ore, there must be at all times an excess of ammonium sulphate in the leaching solution. If air is not used during precipitation with ammonia, the excess ammonium sulphate can not be too great, for it will prevent precipitation of the hydroxide in the later steps. If air is used, the excess ammonium sulphate will not prevent precipitation, but it will increase the impurities in the insoluble manganese, and add to the difficulty of washing. Sulphur is the primary impurity to be avoided. The physical form of the precipitate to a large extent controls the occluded impurities. It has been found that a 1 to 1 molecular ratio of manganese sulphate to ammonium sulphate in the final liquor is a satisfactory ratio for securing a precipitate containing a satisfactorily low impurity content. This ratio corresponds to a solution of $$MnSO_4 - (NH_4)_2SO_4$$

assuming, of course, that such a double salt exists.

If, for any reason, the oxidation of regenerated liquor has been incomplete, that portion of the manganous content which remains dissolved will be returned into the digestion apparatus and will later appear in a subsequent precipitation. Thus there will be no loss. As an incident then to the possibly incomplete precipitation of manganese, the invention contemplates digestion initially with a mixture which may or may not contain manganous sulphate along with the ammonium sulphate. It is essential however, that sufficient ammonium sulphate be present to provide an excess at the end of the digestion, and the excess is preferably one molecular part of ammonium sulphate for each molecular part of manganous sulphate in the solution. This ratio existing at the end of the process will, of course, also be true at every stage of the digestion. The excess insures that the leach liquor has the proper digestive power and has also a retentive power to prevent precipitation of manganese by the alkalinity existing and created during the digestion. Because of the resort to oxidation to effect a more complete removal of the manganese from the extracting liquor, an excess of the leaching salt can be employed to make use of its advantageous property of digestion, with an attendant elimination of its disadvantageous property retarding precipitation of manganous hydroxide by ammonia alone. It should be pointed out, however, that the use of oxidation during the precipitation is not an essential feature of the process at each instance of operation. It may be used only occasionally, and when so used it tends to clear the regenerated leaching salt solution from any manganese which it might otherwise carry.

Various forms of apparatus may be employed to use the above described process. Hereinafter follows a description of efficient means which is economical of heat and of material for the process. As carried out in this apparatus, various modifications of the described process will be observed. However, these are but commercially practicable modifications of the principles above set forth.

The apparatus comprises a reducing furnace 30, preferably of the multi-hearth type. A chute represented at 31 connects the furnace to a feeding conveyor 32 by means of which it is urged forward into a mill 33. This is a rotary drum in which grinding members, such as balls or rods may be used to effect grinding. At 34 the conveyor and a liquid supply conduit 67 merge for an axial entry into the drum. At the other end a pipe 38 carries off the ammonia, and a pump 39 carries the outflowing pulp in line 40 to a reservoir tank and thickener 41 connected by conduit 45 into the ammonia system. The partially digested ore settles to the bottom, and is periodically or continuously removed to enter a second digester 51. This digestion may take place in a depth vessel equipped with agitator and heating coil, but it is important that the depth be not too great for the reasons above indicated.

The ammonia and the vapor in the two conduits 38 and 45 enter a heat exchanger 46 wherein the water vapor is condensed by a flow of cooling agent at about 180° F. In the present apparatus this coolant is the partially exhausted liquor from one digestion step which is flowing into the grinding system above described. The ammonia laden condensate from the heat exchanger 46 passes off through line 47, and the gaseous ammonia is carried away by a conduit 48 to a suction pump 49 which keeps the ammonia in circulation as will later be described.

The clear solution from the thickener 41 flows in a supply line 52 to a series of chambers comprising in the present instance four similar closed tanks connected in parallel by various valved inlets and outlets. The tanks are designated 53, 54, 55 and 56. The leach solution entering the tank series is sufficiently exhausted for the precipitation step. For this purpose the liquid is collected in one or more of the tanks as necessity may require. An optional separation means, such as settling tank 52a, is indicated for removal of iron as above described.

The digester 51 discharges insoluble tailings, which are of course the indigested part of the pulp. It also discharges ammonia gas, water vapor, and partly exhausted leaching solution. The gas and vapor discharge through a conduit 57 leading to a second heat exchanger 58 cooled to about 180° F. by a supply of regenerated leach liquor which enters digester 51 by supply line 59. The two heat exchangers 46 and 58 are connected in parallel on the ammonia side, so as to mix their condensates in line 47, and to merge their discharged ammonia gas in the line 48 leading to the pump 49.

The tailings and the leaching solution from the digester 51 enter a separating and washing system comprising six thickeners 60, 61, 62, 63, 64 and 65. This series employs the countercurrent principle of washing, receiving ore tailings and solution in the first thickener 60, and receiving water in the last thickener 65. The partially exhausted leach solution and the wash water pass out together from the first thickener 60 by means of supply line 66 through heat exchanger 46 and by line 67 into grinding system.

The precipitation of the manganese is effected by oxidation and ammonia treatment of the solution collected in the series of tanks 53 to 56. These tanks are interconnected by a common ammonia conduit 68 which leads to the suction side of the pump 49. Each tank has temperature coils (not shown) so that the solutions therein may be heated or cooled as desired. The tanks are also provided with air inlet connections (not shown) by means of which air may be admitted to sweep out into line 68 any ammonia which may be released on heating the solution. This air in the ammonia system usually provides the oxygen necessary for the precipitation. However, in order to insure a sufficiency of oxygen an air inlet valve 69 is placed on the suction side of the ammonia pump 49 to be used as required.

The solution reserved in the tank series 53 to 56 is forced by means such as pump 70 through a pipe line 71 to a precipitation apparatus. In the present instance this comprises two similar bubble-cap type towers 72 and 73, which effect a counter-current flow of the solution and of an ammonia gas and air mixture. The two towers are connected at their top ends to the line 71 which supplies the liquid containing the manganese to be precipitated. Each tower receives a supply of ammonia and air at its bottom end which gases bubble up through the down-flowing solution. The ammonia and air for the tower 72 are supplied directly by the pump 49. The mixture of gases is passed through the tower 72 in excess of the requirements of the solution flowing down through the tower, in order that the excess may enter tower 73 through conduit 74 in quantity insufficient for the requirements of the solution flowing in tower 73. Thus all the ammonia will be absorbed in tower 73 and the excess air, or the nitrogen left from the air, is allowed to escape through the vent pipe 75. Of course, the rates of material flow are controlled to effect this complete absorption of ammonia.

Since tower 72 discharges completely treated liquor, and tower 73 discharges incompletely treated liquor, the emergent liquids are kept apart. This is accomplished by connecting each tower separately into each of the tanks. The lines 76 and 77 represent the respective discharge systems for the towers 72 and 73.

The construction and operation of this system is such that the amount of ammonia gas employed is less than the chemical equivalent required by the manganese in process. Theoretically, the ammonia liberated in the digestion is held in reserve for the precipitation step, and the quantity liberated is the quantity required, neglecting that excess which is desirable. Actually, it is not held in reserve, except insofar as it is held in the ammonia circulating system, being transmitted from the digesters to the towers wherein it is absorbed. In other words, during the period when it is being theoretically held in reserve for the material from the digestion in which it was liberated, it is being employed in the precipitation of previously digested ore. This arrangement of the process and apparatus and the utilization of the ammonia permits dispensing with a large ammonia storage space which would otherwise be required. The reduction in size of the ammonia system thus minimizes the possibility of leaks and the consequent loss of ammonia, as well as the human hazard accompanying the storage and use of large quantities of ammonia.

The operating steps of the precipitation may be carried out in a variety of ways depending to some extent upon the way in which the tanks and towers are interconnected. The following operation is preferred for the apparatus described. At least three tanks are required, but four are shown, and as many more may be connected in the series as is desired. For example, it may be assumed that tank 53 holds the solution from the digestion, supplied by the line 52. Tank 54 may hold liquid flowing from tower 72, which liquid will contain manganese that is completely precipitated because of the excess of ammonia employed in the tower 72. Tank 55 may contain liquid discharged from tower 73. It will contain incompletely precipitated manganese because of the insufficiency of ammonia used in tower 73. Tank 56 may be employed for any of these solutions as is required. Of the liquid which flows through the excess ammonia tower 72, it is desirable that a portion should have already passed through tower 73. Thus in feeding the towers by the present apparatus, the pump 70 may draw controlled portions (adjusted by the outlet valves) from the tanks 53 and 55. The liquid in these two tanks, prior to passage through the towers, is cooled to 120° F. (50° C.) in order to meet the best precipitating conditions. The discharge from tower 73 is preferably returned into the tank 55 or 56 as desired, and fresh solution from line 52 may be mixed with it if deemed necessary. Such a mixed solution may be used in feeding the towers, thus to eliminate drawing simultaneously from two tanks as above mentioned.

The discharge from tower 72 is not admixed with other liquid. Under the best conditions of operation it contains precipitated manganese hydroxide, ammonium sulphate and excess ammonia. At this point it is heated in tank 54 to release the ammonia, which is then swept out as aforesaid by air. The liquid thus freed from the excess ammonia is then drawn off by line 78 to a separating and washing system.

The washing system employed is the counter-current type similar to that above described for washing the tailings. It comprises the thickeners 79, 80, 81, 82 and 83, and also a continuous filter 84 for concentrating the precipitated manganese to a paste prior to drying. Wash water enters the last thickener 83 and flows against the manganese precipitate and toward the first thickener 79 wherein it mixes with the regenerated ammonium sulphate. The regenerated leach liquor is forced by pump 85, drawing also, if desired, from the thickener 80, into line 86 leading through heat exchanger 58, and thence by line 59 to digester 51 as hereinbefore explained.

The apparatus so far described is complete as to the main process and includes means for the cyclic use of the leach solution and of the ammonia. Air, water, steam and ore are the only materials introduced. The excess air escapes through tower 73 via exit 75. Some water is withdrawn with the wet ore tailings and the wet manganese paste. The rest of the water passes off as a condensate with some dissolved ammonia in the line 47 leading from the two heat exchangers 46 and 58. In order to recover the ammonia content, this condensate is forced by a pump 87 to a recovery tower 88, which is preferably of the bubble-cap type similar to the ammonia towers. The condensate flows downwardly against a jet of steam which strips the ammonia from its solution, permitting the tower to discharge steam and ammonia gas at the top, and water at the bottom. The gas and vapor discharge returns to the ammonia system through a conduit 89, thereby joining the vapors and gases from digester 51. The excess water is discharged at 90, and it may be employed as wash water, thus to save any slight amount of ammonia which it might contain.

In operation of this apparatus various changes may be made from the exemplary procedure given. Likewise, the apparatus may be varied. It is to be noted that there is a high degree of efficiency in materials employed and in heat consumed. This results largely from the cyclic operations described. Portions of the apparatus may be operated intermittently for batches, and other portions for continuous flow at various times.

This is of course dictated by the exigencies of present conditions. The various thickeners and tanks provide large reserve mediums for the material in the various stages of the process. Thus it is easy to effect an efficient operation in any manner desired. The arrangement permits various parts of the apparatus to be temporarily idle for repairs or replacements without the necessity of a complete shut down.

It is of course to be understood that the apparatus may be used for leaching processes on ores other than manganese, and that it is particularly adapted for minerals which are characterized by higher and lower oxides, the one oxide being soluble under conditions which render the other insoluble.

I claim:—

1. In the process of preparing iron-containing manganese ores for digestion with ammonium salt solutions, the method of treating the ore to convert the manganese content to manganous oxide and to maintain an insoluble iron content which comprises heating the ores in the presence of a reducing material to a temperature at which reduction occurs and which is not over 500 degrees centigrade.

2. In a process of preparing iron containing manganese ores for digestion with ammonium salt solutions, the method of treating the ore to convert the manganese content to manganous oxide and to maintain an insoluble iron content, which comprises heating the ores in the presence of a reducing agent and water vapor at a temperature at which reduction occurs and which is not over 500 degrees centigrade.

3. In the process of preparing iron containing manganese ores for digestion with ammonium salts, the method of treating the same to convert the manganese content into manganous oxide and to maintain an insoluble iron content, which comprises heating the ore at a temperature at which reduction occurs and which is not over 500 degrees centigrade in the presence of a burning mixture of illuminating gas and air.

4. The process of treating ores containing oxides of manganese and iron which comprises, reducing the ore to convert the manganese content into manganous oxide, leaching the reduced ore with an ammonium salt with the consequent formation of ammonia, removing ammonia as it is formed, separating the leaching solution from the gangue, removing iron from the leaching solution, and precipitating the manganese by the addition of ammonia which regenerates the ammonium salt.

5. The process of dissolving manganese values from material containing manganous oxide which consists of subjecting the material to digestion in a body of an ammonium salt solution whereby manganous sulphate in solution and ammonia in solution are formed, removing a sufficient portion of ammonia from the solution to maintain in the lowermost depths of the body of liquid a concentration of dissolved ammonia which concentration is less than the prevailing limiting concentration of dissolved ammonia which limit is determined by the fact that a concentration above the limit is effective to precipitate manganous hydroxide from the solution containing manganous sulphate.

WILSON BRADLEY.